United States Patent
Okuyama et al.

(10) Patent No.: US 8,971,475 B2
(45) Date of Patent: Mar. 3, 2015

(54) PLANT WITH PIPING MOUNTED ON BRANCH PIPE AND BOILING WATER REACTOR PLANT

(75) Inventors: Keita Okuyama, Hitachi (JP); Shiro Takahashi, Hitachi (JP); Masami Kato, Hitachi (JP); Akitaka Hidaka, Hitachinaka (JP)

(73) Assignee: Hitachi-GE Nuclear Energy, Ltd., Ibaraki (JP)

( * ) Notice: Subject to any disclaimer, the term of this patent is extended or adjusted under 35 U.S.C. 154(b) by 802 days.

(21) Appl. No.: 12/473,308

(22) Filed: May 28, 2009

(65) Prior Publication Data

US 2009/0296874 A1    Dec. 3, 2009

(30) Foreign Application Priority Data

May 28, 2008   (JP) .................................. 2008-139262

(51) Int. Cl.
| | |
|---|---|
| *G21C 15/00* | (2006.01) |
| *F16K 17/04* | (2006.01) |
| *G21D 1/00* | (2006.01) |

(52) U.S. Cl.
CPC ...... *F16K 17/04* (2013.01); *G21D 1/00* (2013.01); *Y02E 30/40* (2013.01)
USPC .......................................................... 376/370

(58) Field of Classification Search
USPC ......... 376/370, 277, 283, 366, 361, 347, 286, 376/292
See application file for complete search history.

(56) References Cited

U.S. PATENT DOCUMENTS

| | | | |
|---|---|---|---|
| 4,448,023 A | 5/1984 | Arinobu et al. | |
| 4,648,354 A * | 3/1987 | Holcblat et al. | ................ 122/32 |
| 5,205,648 A | 4/1993 | Fissenko | |
| 5,275,486 A | 1/1994 | Fissenko | |
| 5,338,113 A | 8/1994 | Fissenko | |
| 2010/0275632 A1 | 11/2010 | Ishikawa et al. | |

FOREIGN PATENT DOCUMENTS

| | | | |
|---|---|---|---|
| JP | 53-086997 | 7/1978 | |
| JP | 53086997 A * | 7/1978 | |
| JP | 54-118989 | 9/1979 | |
| JP | 54118989 A * | 9/1979 | ............... G21D 5/06 |
| JP | 56-6988 | 1/1981 | |
| JP | 57-69294 | 4/1982 | |

(Continued)

OTHER PUBLICATIONS

G. Deboo, et al., "Quad cities unit 2 main steam line acoustic source identification and load reduction", ICONE 14, (Jul. 2006).

*Primary Examiner* — Timothy A Brainard
(74) *Attorney, Agent, or Firm* — Baker Botts LLP

(57) ABSTRACT

A plant with piping mounted on branch pipe, wherein said piping which introduces gas has a nozzle portion as a joint portion to a vessel and a branch portion connected with a branch pipe; and wherein an enlarged passage portion is formed at least at one of said branch portion and said nozzle portion, and a passage sectional area of said enlarged passage portion is larger than that of said piping other than said enlarged passage portion. Since the flow velocity of the gas flowing inside slows down at the enlarged passage portion, the occurrence of acoustic resonance at the branch portion or the nozzle portion can be suppressed. Accordingly, the fluctuation pressure of the gas flowing in the piping can be reduced even more.

20 Claims, 4 Drawing Sheets

(56) References Cited

FOREIGN PATENT DOCUMENTS

| JP | 60-18691 | 1/1985 |
| JP | 04-256428 | 9/1992 |
| JP | 08247367 A * | 9/1996 |
| JP | 08-261481 | 10/1996 |
| JP | 2006-153869 | 6/2006 |
| JP | 2008-014458 | 1/2008 |
| JP | 2008014458 A * | 1/2008 |
| JP | 2008-57828 | 3/2008 |

* cited by examiner

PLANT WITH PIPING MOUNTED ON BRANCH PIPE AND BOILING WATER REACTOR PLANT

CLAIM OF PRIORITY

The present application claims priority from Japanese Patent application serial no. 2008-139262, filed on May 28, 2008, the content of which is hereby incorporated by reference into this application.

BACKGROUND OF THE INVENTION

1. Technical Field

The present invention relates to a plant with piping mounted on branch pipe and boiling water reactor plant.

2. Background Art

In the boiling water reactor plant (hereinafter referred to as BWR plant) having the boiling water reactor (hereinafter referred to as BWR) being a nuclear reactor, case examples have been reported in which an increase in fluctuation pressure accompanying an increase in main steam flow rate occurs when capacity of electric power generation is increased, resulting in damage to equipment in the BWR plant. Countermeasures such as optimizing passage geometry and increasing structural strength for the main steam system have been taken to avoid damaging the equipment. Such case examples and countermeasures are disclosed in G. Deboo, et al., "Quad cities unit 2 main steam line acoustic source identification and load reduction", ICONE 14, (2006).

Acoustic resonance is thought to be a cause of the fluctuation pressure in the main steam system such as the main steam pipe. In the main steam system from a steam dome in a reactor pressure vessel to a high-pressure turbine via the main steam pipe, pressure waves due to the fluctuation pressure of the steam occur, propagate, and reflect. In consequence, standing waves with a large amplitude (acoustic resonance mode) may be formed and there is a possibility that the amplitude of the fluctuation pressure is increased. In particular, the BWR plants with increased capacity of the electric power generation tend to cause the acoustic resonance because of the large fluctuation pressure of the steam accompanying the increase in the main steam flow rate.

As for the method for suppressing the acoustic resonance, Japanese Patent Laid-open No. 2006-153869, for example, discloses a method for suppressing the fluctuation pressure accompanying the acoustic resonance occurring in the main steam system of the BWR plant by use of a Helmholtz resonance tube. Japanese Patent Laid-open No. 2008-14458 discloses a method for suppressing fluctuation pressure accompanying the acoustic resonance by fitting a canopy member to a cavity where the acoustic resonance is thought to occur.

SUMMARY OF THE INVENTION

Problem to be Solved by the Invention

The inventors studied the occurrence of the acoustic resonance in the BWR plant, and found out that the acoustic resonance tends to occur at branch portions such as joint portions between a vent pipe (branch pipe) and the main steam pipe where a steam safety relief valve is installed.

According to Japanese Patent Laid-open No. 2006-153869, as described above, when the Helmholtz resonance tube is installed in the main steam pipe, the Helmholtz resonance tube can absorb acoustic energy to effectively attenuate the acoustic resonance mode. However, Japanese Patent Laid-open No. 2006-153869 does not take countermeasures against the acoustic resonance occurring at the joint portion between the vent pipe and the main steam pipe where the steam safety relief valve is installed. By suppressing the occurrence of the acoustic resonance at branch portions, the fluctuation pressure in piping with branch portions can be reduced even more.

Japanese Patent Laid-open No. 2008-14458, as with Japanese Patent Laid-open No. 2006-153869, does not take countermeasures against the acoustic resonance occurring at the branch portions of piping such as the main steam pipe.

An object of the present invention is to provide a plant with piping mounted on branch pipe and boiling water reactor plant enabling even more reduced fluctuation pressure due to acoustic resonance.

Solution to Problem

The present invention to accomplish the above object is characterized in that in piping having a nozzle portion as a joint portion to a vessel and a branch portion connected with a branch pipe, and introducing gas through it, an enlarged passage portion is formed at least at one of the branch portion and the nozzle portion, and a passage sectional area of the enlarged passage portion is larger than that of other portion of the piping.

Since the flow velocity of the gas flowing inside slows down at the enlarged passage portion, the occurrence of acoustic resonance at the branch portion or the nozzle portion can be suppressed. Accordingly, the fluctuation pressure of the gas flowing in the piping can be reduced even more.

Advantageous Effects of Invention

According to the present invention, the occurrence of acoustic resonance at the branch portion or the nozzle portion can be suppressed, and the fluctuation pressure of the gas flowing in the piping can be reduced even more.

DETAILED DESCRIPTION OF THE PREFERRED EMBODIMENTS

An embodiment of the present invention is described below.

First Embodiment

Figure 1:
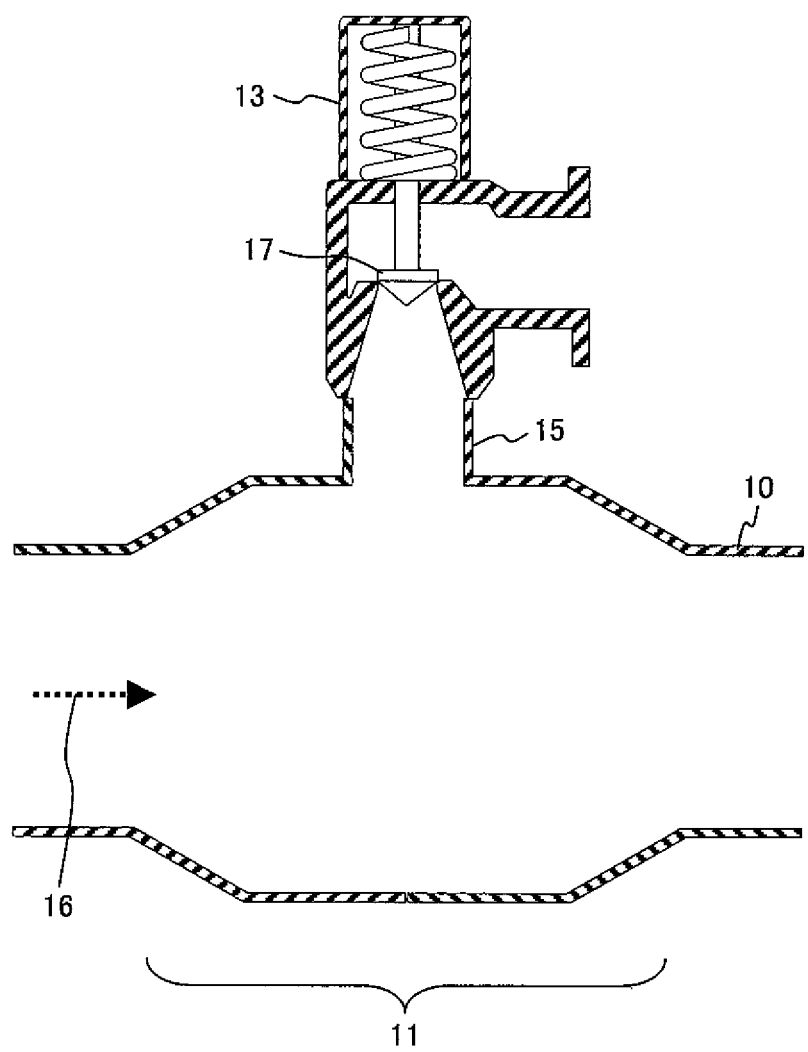
FIG. 1 is an enlarged longitudinal sectional diagram showing a branch portion of a main steam pipe and a vent pipe shown in FIG. 2.
Figure 2:
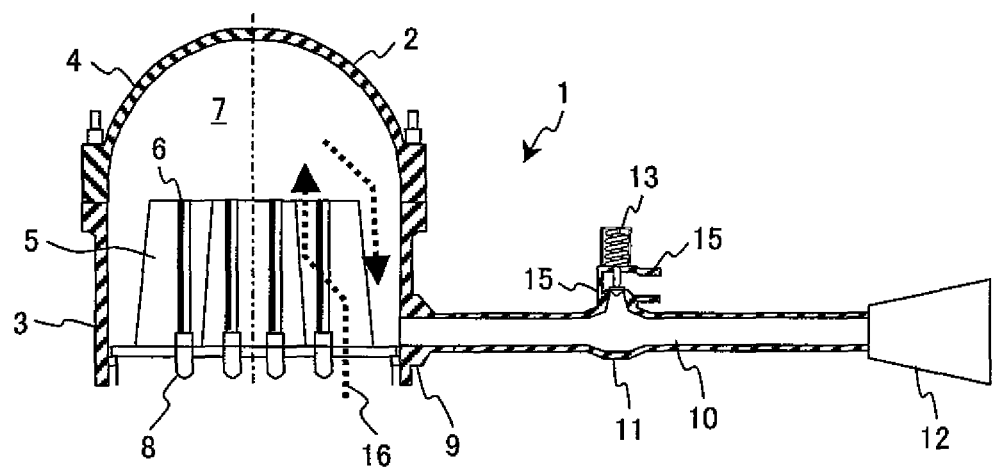
FIG. 2 is a structural diagram of a plant (a boiling water reactor plant) with piping mounted on branch pipe of a first embodiment which is a preferred embodiment of the present invention.

A plant with the piping mounted on branch pipe of a preferred embodiment of the present invention is described below by referring to FIG. 1 and FIG. 2. The plant with the piping mounted on branch pipe of the present embodiment is a BWR plant 1. The BWR plant 1 is provided with a nuclear reactor 2, a main steam pipe 10, a turbine 12, a condenser (not shown), and a feed water pipe (not shown).

The nuclear reactor 2 has a reactor pressure vessel 3 (hereinafter referred to as RPV) and a core placed in the RPV 3. Numbers of fuel assemblies (not shown) are loaded in the core. A removable cover 4 is attached to the RPV 3. In the RPV 3, a steam separator (not shown) is placed above the core, and a steam dryer 5 with corrugated plates 6 is placed above the steam separator. The main steam pipe 10 is connected to a nozzle 9 formed on the RPV 3, and is communicated with a steam dome 7 formed above the steam dryer 5 in the RPV 3. The turbine 12 is connected to the main steam pipe 10. A vent pipe 15 is connected to the main steam pipe 10, and a steam safety relief valve 13 is attached to the vent pipe 15. The vent pipe 15 reaches a pressure suppression room placed in a reactor containment vessel that surrounds the nuclear reactor 2, and a fore-end portion of the vent pipe 15 is immersed in pool water in the pressure suppression room (not shown). A joint portion between the vent pipe 15 and the main steam pipe 10, in other words, a branch portion 11 of the vent pipe 15 and the main steam pipe 10 has larger passage sectional area (inner diameter) than that of the main steam pipe 10 other than the branch portion 11. The branch portion 11 of the main steam pipe 10 is enlarged larger than the main steam pipe 10 other than the branch portion 11. The branch portion 11 is an enlarged passage portion, and the vent pipe 15 is a branch pipe.

Cooling water in the RPV 3 is pressurized by driving a recirculation pump (not shown) and is jetted from a nozzle of a jet pump (not shown). The jetted cooling water flow sucks cooling water around the nozzle into the jet pump and the joined cooling water is discharged from the jet pump. The discharged cooling water is supplied to the core. The heat generated by the nuclear fission of nuclear fuel material in the fuel assemblies heats the cooling water during the upward movement through the core, and part of the heated cooling water becomes steam 16. The steam separator and the steam dryer 5 remove moisture contained in the steam 16. The steam 16, from which the moisture has been removed, is introduced to the turbine 12 through the main steam pipe 10, and rotates the turbine 12. A generator (not shown) coupled to the turbine 12 is rotated, and generates electric power. The steam 16 exhausted from the turbine 12 is condensed in a condenser (not shown) to become water. The water is pressurized by a feed pump (not shown) and is supplied into the RPV 3 as feed water through the feed water pipe (not shown). The nuclear reactor 2 of the BWR plant is a steam generator. The moisture separated in the steam dryer 5 is discharged into a region formed below the steam dryer 5 and between the steam separators through a drain pipe 8.

If the inner pressure of the RPV 3 was to rise above a set value, the steam safety relief valve 13 automatically opens. In other words, the valve disc 17 of the steam safety relief valve 13 is pushed up. The steam 16 in the RPV 3 is emitted into the pool water in the pressure suppression room through the main steam pipe 10 and the steam safety valve 13, and the steam 16 is condensed with the pool water. The inner pressure of the RPV 3 is, therefore, suppressed lower than the set value, and the safety of the nuclear reactor 2 is secured.

In the normal operation of the BWR plant 1, the flow velocity of the steam 16 introduced to the turbine 12 slows down in the branch portion 11 where the passage sectional area increases. If the flow rate of the steam 16 flowing in the main steam pipe 10 is constant, the flow velocity of the steam 16 in the branch portion 11 gets smaller in reverse proportion to the squared inner diameter of the branch portion 11.

The fluctuation pressure occurring at the branch portion 11 accompanying the acoustic resonance caused by the flow of the steam 16 is represented by Equation (1) with a dimensionless number called the Strouhal number (St):

$$St = f \times d / U \tag{1}$$

where d is a diameter of the main steam safety relief valve 13, U (m/S) is flow velocity of the steam 16 at the branch portion 11, and f is frequency ($s^{-1}$) of the fluctuation pressure accompanying the acoustic resonance occurring at the branch portion 11. The frequency f is represented by Equation (2):

$$f = c/(4L) \tag{2}$$

where c is speed (m/S) of sound of the steam 16 flowing in the branch portion, and L is a length (m) of the main steam safety relief valve 13. In other words, the flow velocity of the steam 16 at the branch portion 11 is in a reverse proportion relation to the St number.

Figure 3:
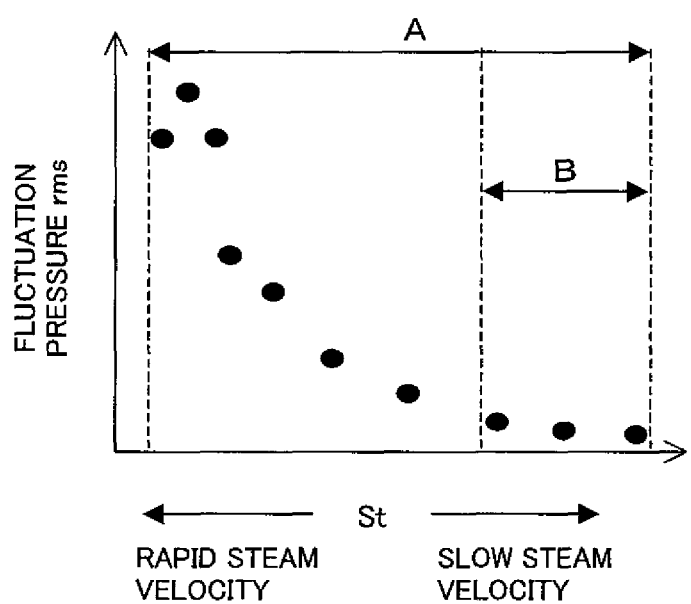
FIG. 3 is a characteristic diagram showing a relationship between St number and fluctuation pressure expressed as root-mean-square (rms).

A profile of root-mean-square (rms) that expresses the degree of the fluctuation pressure at the branch portion 11 of the present embodiment versus the St number is shown in FIG. 3. When the reactor power (electric generating power) of the BWR plant 1 is increased, the core flow rate (flow rate of cooling water supplied to the core) is increased, thereby leading to an increase in the flow rate of the main steam. In the present embodiment, since the passage sectional area of the main steam pipe 10 is enlarged at the branch portion 11, the flow velocity of the steam 16 flowing in the branch portion 11 slows down, and the fluctuation pressure occurring at the branch portion 11 decreases (region B). The decrease in the fluctuation pressure is brought about by the suppression of the occurrence of acoustic resonance at the branch portion 11 due to the reduced flow velocity of the steam 16 because of the enlargement of the passage sectional area at the branch portion 11.

In the conventional BWR plant where the passage sectional area of the branch portion is the same as the portions other than the main steam pipe 10 and a Helmholtz resonance tube is not installed, since the flow velocity of the steam 16 at the branch portion becomes faster than that of the present embodiment, the fluctuation pressure may increase like region A shown in FIG. 3. In contrast, in the present embodiment, since the passage sectional area of the branch portion 11 is larger than that of the steam pipe 10 other than the branch portion 11, the occurrence of acoustic resonance is suppressed and the fluctuation pressure is reduced when compared with the conventional BWR plant.

The reason why the present embodiment can suppress the occurrence of acoustic resonance in this way is described below. By forming the enlarged passage portion, if the flow rate of the steam flowing in the main steam pipe 10 does not change, the linear flow velocity is reduced in the enlarged passage portion. For this reason, the fluctuation pressure is reduced like region B shown in FIG. 3. In the meantime, at the branch portion of the main steam pipe 10 and the vent pipe 15, vortexes occur in the steam flow. If the period of vortex generation comes close to the natural frequency peculiar to the configuration of the equipment of the BWR plant 1, sounds generated by the vortexes are intensified. This phenomenon is called acoustic resonance. When the flow velocity of the steam is slowed down by forming the enlarged passage portion (branch portion 11 having the passage sectional area that is larger than that of the steam pipe 10 except the branch portion 11) like the present embodiment, the period of the vortex generation generated at the branch portion 11 of the main steam pipe 10 and the vent pipe 15 becomes longer, and the period of the vortex generation departs from the natural frequency described above. Accordingly, the occurrence of fluctuation pressure is reduced.

When the enlarged passage portion is formed at the downstream side of the branch portion 11 of the main steam pipe 10 and the vent pipe 15, the occurrence of acoustic resonance at the branch portion 11 cannot be suppressed. The reason why the occurrence of acoustic resonance is not suppressed is that even if the enlarged passage portion is formed at the downstream side, the vortexes are generated at the branch portion and the flow velocity of the steam is not slowed down at the branch portion, the period of the vortex generation does not depart from the natural frequency described above.

In a BWR plant of which the main steam pipe is equipped with a Helmholtz resonance tube, described in Japanese Patent Laid-open No. 2006-153869, since the Helmholtz resonance tube is installed, the occurrence of acoustic resonance is suppressed and the peak value of the fluctuation pressure is reduced when compared with the conventional BWR plant described above, wherein the passage sectional area of the branch portion of the steam pipe 10 is the same as that of other portion of the main steam pipe 10 and the Helmholtz resonance tube is not installed. However, in the BWR plant described in Japanese Patent Laid-open No. 2006-153869, the passage sectional area of the branch portion to which the vent tube is connected is the same as that of other portion of the main steam pipe 10, that is to say, the branch portion with an enlarged passage sectional area is not formed, the flow velocity of the steam 16 at the branch portion is not slowed down. Consequently, in the region where the flow velocity of the steam 16 is faster than that in region B shown in FIG. 3, the peak of the fluctuation pressure described above occurs. In the BWR plant described in Japanese Patent Laid-open No. 2006-153869, the peak value of the fluctuation pressure caused by the acoustic resonance becomes larger than the fluctuation pressure of the present embodiment in region B. The fluctuation pressure in the present embodiment is reduced more than that in Japanese Patent Laid-open No. 2006-153869.

In the present embodiment, a center axis of the branch portion 11 of which the passage sectional area is enlarged is in alignment with the center axis of the main steam pipe 10 at the upstream side and the downstream side of the branch portion 11. For this reason, the occurrence of acoustic resonance at the branch portion 11 can be effectively suppressed. Even when the center axis of the branch portion 11 is not in alignment with the center axis of the main steam pipe 10 at the upstream side and the downstream side of the branch portion 11, the fluctuation pressure of the steam 16 is reduced more than that in Japanese Patent Laid-open No. 2006-153869, but when these center axes are aligned, the fluctuation pressure of the steam 16 can be further reduced.

In the present embodiment, since the occurrence of acoustic resonance at the branch portion 11 can be suppressed to reduce the fluctuation pressure of the steam 16 flowing in the main steam pipe 10, a power uprate of the BWR plant 1 can easily be accomplished. The power uprate of the BWR plant 1 is performed in such a way that the core flow rate is increased, thereby increasing the reactor power over the rated power (100% power). In the power uprate, the flow rate of the steam supplied to the turbine 12 is increased. In the present embodiment, since the occurrence of acoustic resonance at the branch portion 11 can be suppressed by forming the enlarged passage portion at the branch portion 11 to reduce the fluctuation pressure of the steam 16 flowing in the main steam pipe, the flow rate of the steam 16 supplied to the turbine 12 can easily be increased. Consequently, the present embodiment can easily accomplish the power uprate of the BWR plant 1.

In the present embodiment, since the enlarged passage portion is formed at the branch portion 11, the reactor building needs not to be enlarged.

Second Embodiment

Figure 4:
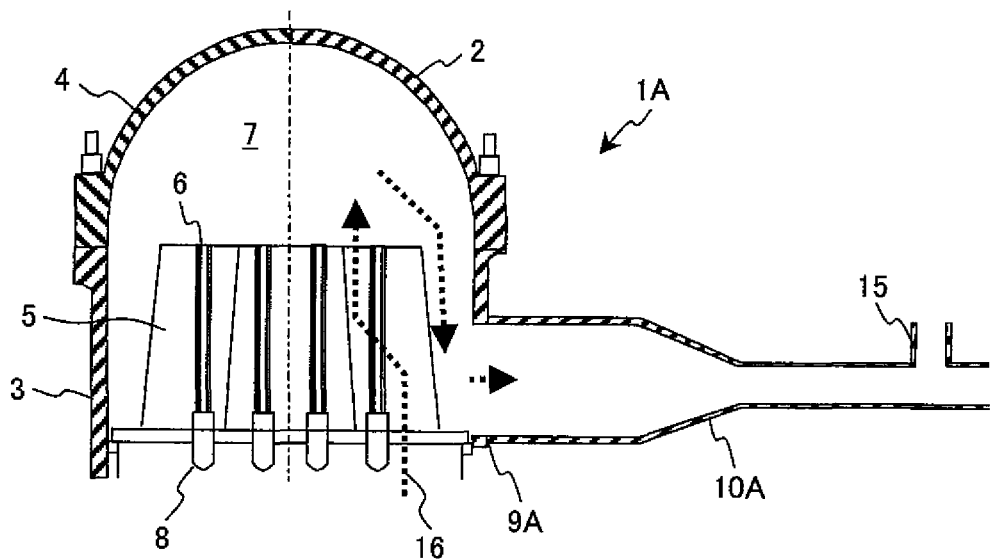
FIG. 4 is a structural diagram of a plant (a boiling water reactor plant) with piping mounted on branch pipe of a second embodiment which is another embodiment of the present invention.

A plant with the piping mounted on branch pipe of another embodiment of the present invention is described below by referring to FIG. 4. The plant with the piping mounted on branch pipe of the present embodiment is a BWR plant 1A. The BWR plant 1A is comprised of a nuclear reactor 2, a main steam pipe 10A, a turbine 12, a condenser (not shown), and a feed water pipe (not shown). In the BWR plant 1A of the present embodiment, an enlarged passage portion is formed at a nozzle 9A formed on a RPV 3 and located upstream of a joint portion between the main steam pipe 10A and a vent pipe. In the present embodiment, the nozzle 9A is a part of the main steam pipe 10A. The BWR plant 1A has the same structure as that of the BWR plant 1 except that the enlarged passage portion is formed not at a branch portion 11 but at the nozzle 9A. The inner diameter of the nozzle 9A is larger than that of the main steam pipe 10A other than the nozzle 9A.

Since the passage sectional area of the nozzle 9A of the main steam pipe 10A is larger than that of the main steam pipe 10A other than the nozzle 9A, the present embodiment can obtain the same effect as that of the first embodiment. In other words, the occurrence of acoustic resonance at a joint portion between a vent pipe 15 and the main steam pipe 10A (the branch portion of the main steam pipe 10A) can be suppressed, and the fluctuation pressure of the steam 16 is reduced more than that in Japanese Patent Laid-open No. 2006-153869. It is also not needed for the present embodiment where the enlarged passage portion is formed at the nozzle 9A to increase the size of a reactor building.

The reason why the present embodiment can suppress the acoustic resonance at the nozzle 9A is as follows. In the nozzle 9 (first embodiment) where the enlarged passage portion is not formed, since the steam flow exhausted from the RPV 3 is rapidly narrowed down, that is to say, becomes contracted, the fluctuation pressure that turns into sound occurs at the nozzle 9. In contrast, in the present embodiment, the contraction effect at the nozzle 9A can be reduced by gradually changing the passage sectional area of the nozzle 9A down to the main steam pipe 10A downstream of the nozzle 9A. For this reason, the fluctuation pressure of the steam that turns into sound at the nozzle 9A can be suppressed.

In the present embodiment, the enlarged passage portion formed in the first embodiment can be, further, formed at the branch portion of the steam pipe 10A and the vent pipe 15. Since the flow velocity of the steam can be slowed down at the nozzle 9A and the branch portion, the fluctuation pressure of the steam flowing in the main steam pipe 10A can be reduced more than in the first embodiment.

Third Embodiment

Figure 5:
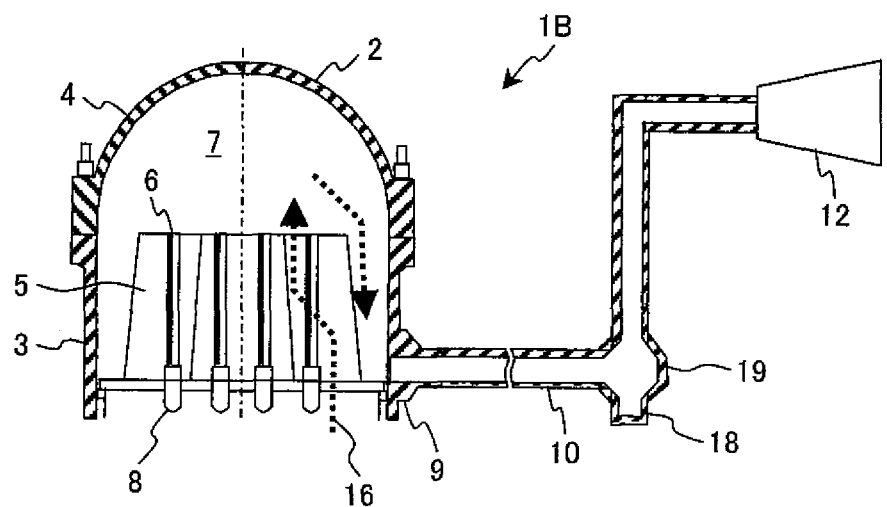
FIG. 5 is a structural diagram of a plant (a boiling water reactor plant) with piping mounted on branch pipe of a third embodiment which is still another embodiment of the present invention.

A plant with the piping mounted on branch pipe of another embodiment of the present invention is described below by referring to FIG. 5. The plant with the piping mounted on branch pipe of the present embodiment is a BWR plant 1B. The BWR plant 1B is, similarly to the BWR plant 1, comprised of a nuclear reactor 2, a main steam pipe 10, a turbine 12, a condenser (not shown), and a feed water pipe (not shown). In some BWR plants, a branch pipe 18 of which one end is sealed off is connected to the main steam pipe 10. In the BWR plant 1B of the present embodiment, the main steam pipe 10 is equipped with a branch pipe 18. An inner diameter of a joint portion between the main steam pipe 10 and the branch pipe 18, that is to say, a branch portion (an enlarged passage portion) 19 is larger than that of the main steam pipe 10 other than the branch portion 19. The passage sectional area of the branch portion 19 is larger than that of the main steam pipe 10 other than the branch portion 19.

The flow velocity of the steam 16 flowing in the main steam pipe 10 slows down in the branch portion 19. For this reason, in the present embodiment, the acoustic resonance at the branch portion 19 of the main steam pipe 10 and the branch pipe 18 can be suppressed, and the fluctuation pressure of the steam 16 can be reduced as with the first embodiment.

The branch pipe 18 is located downstream of a branch portion 11 (not shown) of a vent pipe 15 (not shown) and the main steam pipe 10. Since the passage sectional area of the branch portion 11 is, similarly to the first embodiment, enlarged, the occurrence of acoustic resonance at the branch portion 11 of the vent pipe 15 and the main steam pipe is suppressed.

Fourth Embodiment

Figure 6:
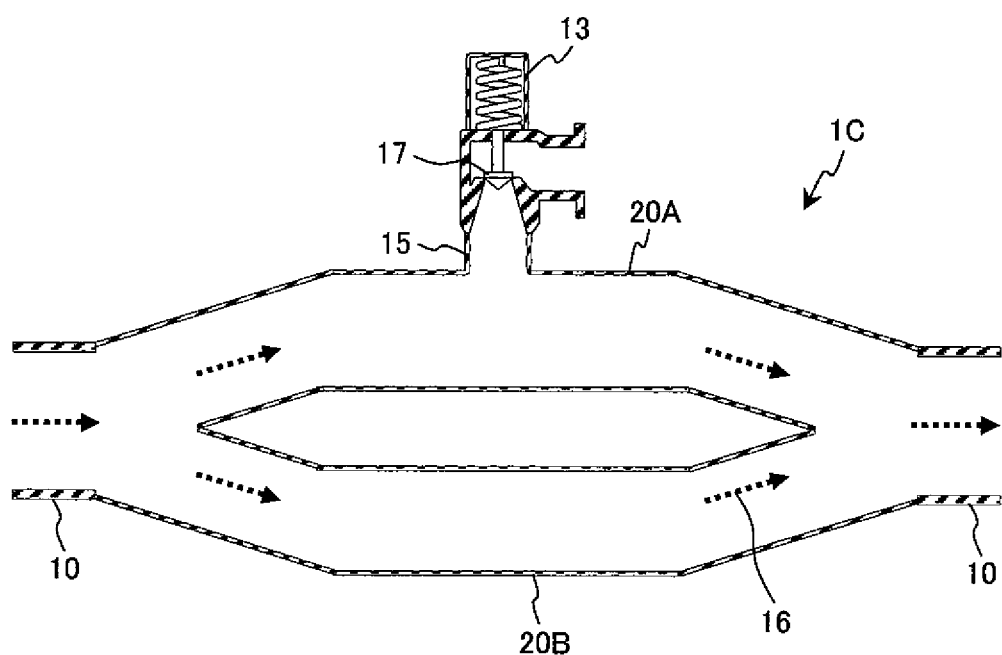
FIG. 6 is a structural diagram of a plant (a boiling water reactor plant) with piping mounted on branch pipe of a fourth embodiment which is still another embodiment of the present invention.

A plant with the piping mounted on branch pipe of another embodiment of the present invention is described below by referring to FIG. 6. The plant with the piping mounted on branch pipe of the present embodiment is a BWR plant 1C. The BWR plant 1C is, similarly to the BWR plant 1, provided with a nuclear reactor 2, a main steam pipe 10, a turbine 12, a condenser (not shown), and a feed water pipe (not shown). In the BWR plant 1C of the present embodiment, the main steam pipe 10 at the branch portion of the vent pipe 15 is comprised of two steam paths 20A and 20B instead of the branch portion 11 formed in the first embodiment. A vent pipe 15 to which a steam safety relief valve 13 is attached is connected to the steam path 20A. The steam paths 20A and 20B are connected to the main steam pipe 10 upstream of the branch portion of the vent pipe 15 and the steam path 20A, and are also connected to the main steam pipe 10 downstream of the branch portion. The steam paths 20A and 20B are connected to the main steam pipe 10 upstream and downstream of the branch portion with a same tilt angle to avoid an increase in pressure loss. The inner diameter of each of the steam paths 20A and 20B is the same as the inner diameter of the main steam pipe 10. The passage sectional area of the main steam pipe 10 at the branch portion of the vent pipe 15 and the steam path 20A is doubled by the installation of the steam paths 20A and 20B. The installation of the steam paths 20A and 20B provides the same function as forming the branch portion 11 of the first embodiment to the branch portion of the vent pipe 15 and the steam path 20A (the branch portion of the vent pipe 15 and the main steam pipe 10). In other words, since the flow velocity of the steam slows down at the steam paths 20A and 20B, the occurrence of acoustic resonance is suppressed at the branch portion of the vent pipe 15 and the steam path 20A and the fluctuation pressure of the steam 16 is reduced.

In the present embodiment, since the plurality of steam paths (such as the steam paths 20A and 20B) are formed at a part of the main steam pipe 10 such as the branch portion of the vent pipe 15 and the main steam pipe 10, it is not needed to increase the size of the reactor building.

In the third embodiment, as with the present embodiment, the branch portion 19 can be comprised of a plurality of steam paths.

Each embodiment described above is applicable to a plant having piping mounted on branch pipe with gas (steam, air, etc.) flowing inside such as a pressurized water reactor plant with a steam pipe connecting a steam generator with a turbine, and a thermal power plant with a steam pipe connecting a boiler with a turbine. Each embodiment described above is also applicable to a space heating system with a steam pipe connected to a steam generator.

What is claimed is:

1. A plant with piping,
wherein said piping includes a main pipe connected to a turbine and which introduces steam to said turbine, said main pipe having a nozzle portion as a joint portion to a vessel and a branch portion of said main pipe connected with a branch pipe having a steam safety relief valve attached thereto, said branch pipe being said branch portion of said main pipe extended from said main pipe; and
wherein an enlarged passage portion of said main pipe is formed at said branch portion of said main pipe at the connection with said branch pipe having said steam safety relief valve attached thereto and which extends from said main pipe, and a passage sectional area of said enlarged passage portion of said main pipe at said branch portion is larger than a passage sectional area of said main pipe at an upstream side and at a downstream side of said enlarged passage portion of said main pipe, and said branch pipe having said steam safety relief valve attached thereto and which extends from said main pipe is connected to said enlarged passage portion of said main pipe at said branch portion of said main pipe.

2. The plant with piping according to claim 1,
wherein a center axis of said enlarged passage portion of said main pipe is in alignment with a center axis of said main pipe at the upstream side and at the downstream side of said enlarged passage portion of said main pipe.

3. The plant with piping according to claim 1,
wherein said enlarged passage portion of said main pipe includes a plurality of steam paths connected to said main pipe.

4. The plant with piping according to claim 1,
wherein said main pipe is a steam pipe connected to said vessel which is a steam generator.

5. The plant with piping according to claim 1,
wherein said plant is one of a reactor plant and a thermal power plant.

6. The plant with piping according to claim 1,
wherein said enlarged passage portion of said main pipe formed at said branch portion of said main pipe enables a reduction in flow of steam thereat and decrease of fluctuation pressure at said branch portion with suppression of occurrence of acoustic resonance.

7. A boiling water reactor plant comprising:

a nuclear reactor; and a main steam pipe having a nozzle part connected to said nuclear reactor and introducing steam generated in said nuclear reactor to a turbine which is connected to said main steam pipe, and a branch portion of said main steam pipe is connected with a branch pipe having a steam safety relief valve attached thereto, said branch pipe being said branch portion of said main steam pipe extended from said main steam pipe, wherein an enlarged passage portion of said main steam pipe is formed at said branch portion of said main steam pipe at the connection with said branch pipe having said steam safety relief valve attached thereto, and a passage sectional area of said enlarged passage portion of said main steam pipe at said branch portion is larger than a passage sectional area of said main steam pipe at an upstream side and at a downstream side of said enlarged passage portion of said main steam pipe, and said branch pipe having said steam safety relief valve attached thereto is connected to and extended from said enlarged passage portion of said main steam pipe at said branch portion.

8. The boiling water reactor plant according to claim 7, wherein a center axis of said enlarged passage portion of said main steam pipe is in alignment with a center axis of said main steam pipe at a downstream side of said enlarged passage portion of said main steam pipe.

9. The boiling water reactor plant according to claim 7, wherein said enlarged passage portion of said main steam pipe includes a plurality of steam paths connected to said main steam pipe.

10. The boiling water reactor plant according to claim 7, wherein said enlarged passage portion of said main steam pipe formed at said branch portion of said main steam pipe enables a reduction in flow of steam thereat and decrease of fluctuation pressure at said branch portion with suppression of occurrence of acoustic resonance.

11. A plant with piping, wherein said piping includes a main steam pipe which introduces steam to a turbine connected to said main steam pipe, said main steam pipe having a nozzle portion as a joint portion to a vessel and a branch portion connected with a branch pipe having a steam safety relief valve attached thereto, said branch pipe being a branch portion of said main steam pipe extended from said main steam pipe; and wherein an enlarged passage portion of said main steam pipe is formed at said branch portion, and a passage sectional area of said enlarged passage portion at said branch portion is larger than a passage sectional area of said main steam pipe at a downstream side of said enlarged passage portion of said main steam pipe.

12. The plant with piping according to claim 11, wherein a center axis of said enlarged passage portion is in alignment with a center axis of said main steam pipe at the downstream side of said enlarged passage portion of said main steam pipe.

13. The plant with piping according to claim 11, wherein said main steam pipe is connected to a steam generator as said vessel.

14. The plant with piping according to claim 11, wherein said plant is one of a reactor plant and a thermal power plant, and wherein said enlarged passage portion of said main steam pipe formed at said branch portion of said main steam pipe enables a reduction in flow of steam thereat and decrease of fluctuation pressure at said branch portion with suppression of occurrence of acoustic resonance.

15. A boiling water reactor plant comprising:

a nuclear reactor; and a main steam pipe connected to a turbine, said main steam pipe having a nozzle part connected to said nuclear reactor and introducing steam generated in said nuclear reactor to said turbine, said main steam pipe having a branch portion connected with a branch pipe having a steam safety relieve valve attached thereto, said branch pipe being said branch portion of said main steam pipe extended from said main steam pipe;

wherein an enlarged passage portion is formed of said main steam pipe at said branch portion at the connection with said branch pipe having said steam safety relieve valve attached thereto, and a passage sectional area of said enlarged passage portion of said main steam pipe at said one of said nozzle portion and said branch portion is larger than a passage sectional area of said main steam pipe at least at a downstream side of said enlarged passage portion of said main steam pipe.

16. The boiling water reactor plant according to claim 15, wherein a center of said enlarged passage portion is in alignment with a center axis of said main steam pipe at the downstream side of said enlarged passage portion of said main steam pipe.

17. The boiling water reactor plant according to claim 15, wherein said enlarged passage portion includes a plurality of steam paths connected to said main steam pipe.

18. The boiling water reactor plant according to claim 15, wherein said enlarged passage portion of said main steam pipe formed at said branch portion of said main steam pipe enables a reduction in flow of steam thereat and decrease of fluctuation pressure at said branch portion with suppression of occurrence of acoustic resonance.

19. The boiling water reactor plant according to claim 15, wherein said nozzle portion forms another enlarged passage portion of said main pipe.

20. The boiling water reactor plant according to claim 15, wherein said enlarged passage portion of said main steam pipe is formed at said branch portion at the connection with said branch pipe and has the passage sectional area which is larger than the passage sectional area of said main steam pipe at both of the downstream side and an upstream side of said enlarged passage portion of said main steam pipe, said enlarged passage portion of said main steam pipe enabling a reduction in flow of steam thereat and decrease of fluctuation pressure with suppression of occurrence of acoustic resonance.

* * * * *